(12) United States Patent
Tang et al.

(10) Patent No.: US 11,385,967 B2
(45) Date of Patent: Jul. 12, 2022

(54) METHOD FOR MANAGING BACKUP DATA BY HAVING SPACE RECYCLING OPERATIONS ON EXECUTED BACKUP DATA BLOCKS

(71) Applicant: EMC IP Holding Company LLC, Hopkinton, MA (US)

(72) Inventors: Jun Tang, Chengdu (CN); Yi Wang, Chengdu (CN); Qingxiao Zheng, Chengdu (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 86 days.

(21) Appl. No.: 15/930,210

(22) Filed: May 12, 2020

(65) Prior Publication Data
US 2021/0263807 A1 Aug. 26, 2021

(30) Foreign Application Priority Data
Feb. 24, 2020 (CN) .......................... 202010113257.3

(51) Int. Cl.
*G06F 11/14* (2006.01)
*G06F 3/06* (2006.01)
(52) U.S. Cl.
CPC .......... *G06F 11/1464* (2013.01); *G06F 3/064* (2013.01); *G06F 3/067* (2013.01); *G06F 3/0619* (2013.01); *G06F 3/0647* (2013.01); *G06F 3/0653* (2013.01); *G06F 11/1451* (2013.01); *G06F 11/1469* (2013.01)

(58) Field of Classification Search
CPC .... G06F 11/1464; G06F 3/0619; G06F 3/064; G06F 3/0647; G06F 3/0653; G06F 3/067; G06F 11/1451; G06F 11/1469
See application file for complete search history.

(56) References Cited

U.S. PATENT DOCUMENTS

2013/0339297 A1* 12/2013 Chen .................... G06F 16/273
707/624
2021/0240575 A1* 8/2021 Mulheren .......... G06F 11/1464

* cited by examiner

*Primary Examiner* — Tammara R Peyton
(74) *Attorney, Agent, or Firm* — Womble Bond Dickinson (US) LLP

(57) ABSTRACT

Embodiments of the present disclosure relate to a method for managing backup data, an electronic device, and a computer program product. This method comprises: determining a number of times of space recycling operations that have been executed on a backup data block; determining, based on the number of times, a current popularity of the backup data block, the current popularity at least indicating a probability that the backup data block will be recycled in a to-be-executed space recycling operation; and moving, based on a determination that a former storage area where the backup data block is located does not correspond to the current popularity, the backup data block to a target storage area corresponding to the popularity. In this way, data with similar popularity can be managed in a more centralized manner, thereby reducing data rewriting caused by subsequent space recycling.

18 Claims, 6 Drawing Sheets

METHOD FOR MANAGING BACKUP DATA BY HAVING SPACE RECYCLING OPERATIONS ON EXECUTED BACKUP DATA BLOCKS

CROSS-REFERENCE TO RELATED APPLICATION

This patent application claims priority, under 35 U.S.C. § 119, of Chinese Patent Application No. 202010113257.3, filed Feb. 24, 2020, which is incorporated by reference in its entirety.

TECHNICAL FIELD

Embodiments of the present disclosure relate to the field of computers, and more specifically to a method for managing backup data, an electronic device, and a computer program product.

BACKGROUND

In recent years, with the development of computer technologies, people are increasingly concerned about the security of data storage. Data backup also has become a common technique to ensure data security. As the size of data backed up by users is getting increasingly huge, storage spaces required by backup data are also becoming increasingly large. Therefore, how to effectively organize the storage of the backup data has become one of the focuses of attention at present.

SUMMARY OF THE INVENTION

Embodiments of the present disclosure provide a scheme for managing backup data.

According to a first aspect of the present disclosure, a method for managing backup data is presented. This method includes: determining a number of times of space recycling operations that have been executed on a backup data block; determining, based on the number of times, a current popularity of the backup data block, the current popularity at least indicating a probability that the backup data block will be recycled in a to-be-executed space recycling operation; and moving, based on a determination that a former storage area where the backup data block is located does not correspond to the current popularity, the backup data block to a target storage area corresponding to the popularity.

According to a second aspect of the present disclosure, an electronic device is presented. The device includes: at least one processing unit; and at least one memory, the at least one memory being coupled to the at least one processing unit and storing instructions to be executed by the at least one processing unit, the instructions, when executed by the at least one processing unit, causing the device to execute actions, the actions including: determining a number of times of space recycling operations that have been executed on a backup data block; determining, based on the number of times, a current popularity of the backup data block, the current popularity at least indicating a probability that the backup data block will be recycled in a to-be-executed space recycling operation; and moving, based on a determination that a former storage area where the backup data block is located does not correspond to the current popularity, the backup data block to a target storage area corresponding to the popularity.

In a third aspect of the present disclosure, a computer program product is provided. The computer program product is stored in a non-transitory computer storage medium and includes machine-executable instructions. The machine-executable instructions, when running in a device, cause the device to execute any step of the method according to the first aspect of the present disclosure.

The Summary of the Invention is provided to introduce a selection of concepts in a simplified form, which will be further described in the Detailed Description below. The Summary of the Invention is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

DETAILED DESCRIPTION

Preferred embodiments of the present disclosure will be described in more detail below with reference to the accompanying drawings. The preferred embodiments of the present disclosure are shown in the accompanying drawings. However, it should be understood that the present disclosure can be implemented in various forms and should not be limited to the embodiments set forth herein. In contrast, these embodiments are provided to make the present disclosure more thorough and complete, and fully convey the scope of the present disclosure to those skilled in the art.

The term "including" and variants thereof used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions can be further included below.

Figure 1:
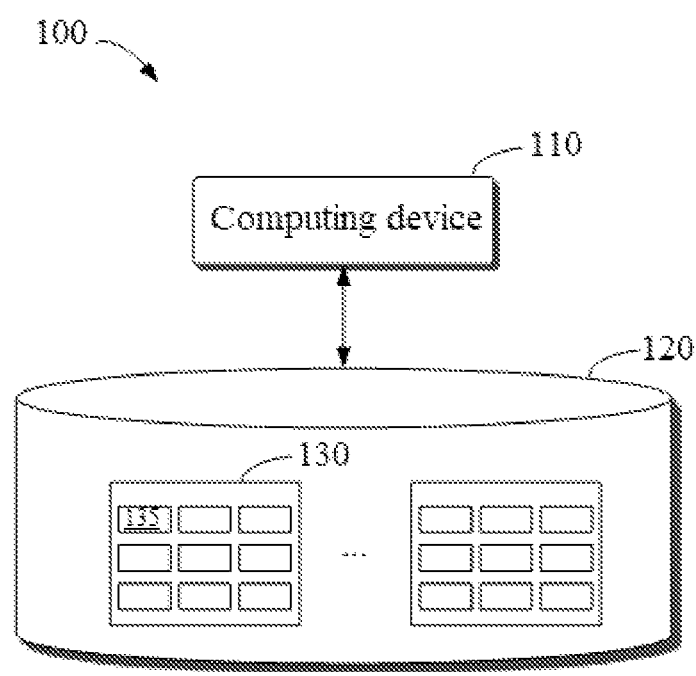
FIG. 1 illustrates a schematic diagram of an example environment in which a plurality of embodiments of the present disclosure can be implemented.

FIG. 1 shows a schematic diagram of environment 100 in which embodiments of the present disclosure may be implemented. As shown in FIG. 1, environment 100 includes computing device 110 and backup storage apparatus 120. Backup storage apparatus 120 may include a plurality of storage blocks 130. Each storage block 130 may store backup data block 135 of a predetermined size. Computing device 110 can manage organization of backup data block 135 in backup storage apparatus 120.

Figure 2:
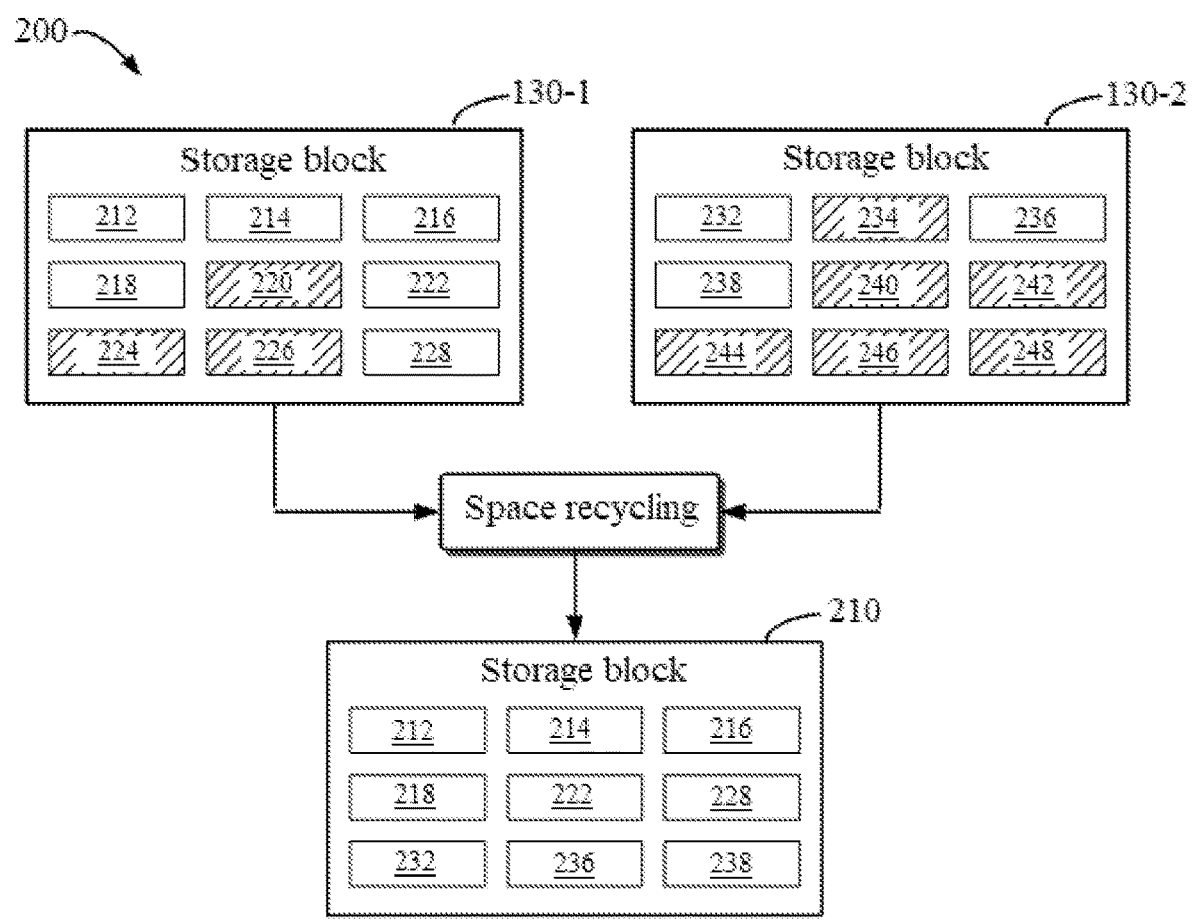
FIG. 2 illustrates a schematic diagram of an example space recycling process.

For example, backup data block 135 in backup storage apparatus 120 may be invalid due to backup expiring. As an example, computing device 110 may set up a rule according to which backup data block 135 will be marked as invalid after the backup data block has not been cited by any backup file for a period of time. Since backup storage apparatus 120 is always allocated or released with storage block 130 as a unit in a unified way, computing device 110 can release a storage space occupied by invalid backup data block 135 through a space recycling process (e.g., trash recycling). FIG. 2 shows schematic diagram 200 of a space recycling process according to an example.

As shown in FIG. 2, storage block 130-1 includes a plurality of backup data blocks 212-228, and storage block 130-2 includes a plurality of backup data blocks 232-248, where backup data blocks 220, 224, 226, 234, 240, 242, 244, 246, and 248 shown by slashes indicate that these backup data blocks have already been in an invalid state due to backup expiring or backup being deleted. In the space recycling process, computing device 110, e.g., may apply for new storage block 210, and write backup data blocks 212, 214, 216, 218, 222, 228, 232, 236, and 238 that are not marked as invalid in former storage block 130-1 and storage block 130-2 in new storage block 210. Then, computing device 110 can release former storage block 130-1 and 130-2, thereby implementing recycling of spaces.

Since computing device 110 needs to apply for and recycle spaces with the storage blocks as units, such that in the space recycling process, computing device 110 needs to rewrite some of the backup data blocks. For example, for an example in FIG. 2, if storage block 210 needs to merge valid backup data blocks with another storage block in a new space recycling process, but for example, backup data block 212 is still marked as a valid state. In this case, backup data block 212 will be rewritten in a new storage block. In a backup system, backup data blocks are usually randomly organized, such that relatively stable backup data blocks such as backup data block 212 may undergo repeated rewriting in the space recycling process.

At present, more and more high-performance storage apparatuses (e.g., SSD) are used as backup storage apparatus 120. Such high-performance storage apparatuses generally have better performance, but generally tend to have further limited number of writable times. Repeated rewriting of the backup data blocks will seriously affect usable life of backup storage apparatus 120, which is not desired by users.

According to the embodiments of the present disclosure, a scheme of managing backup data is provided. In this scheme, a number of times of space recycling operations that have been executed on a backup data block is determined, and is subsequently used for determining a current popularity of the backup data block, where the current popularity at least indicates a probability that the backup data block will be recycled in a to-be-executed space recycling operation. When a former storage area where the backup data block is located does not correspond to the current popularity, the backup data block will be moved to a target storage area corresponding to the popularity. In this way, backup data blocks are always organized based on popularities, such that backup data blocks that are more probably recycled will be more probably gathered into the same storage area in the space recycling process, such that a storage area of a backup data block with a lower storage popularity is more stable, thereby reducing data rewriting caused by subsequent space recycling.

Figure 3:
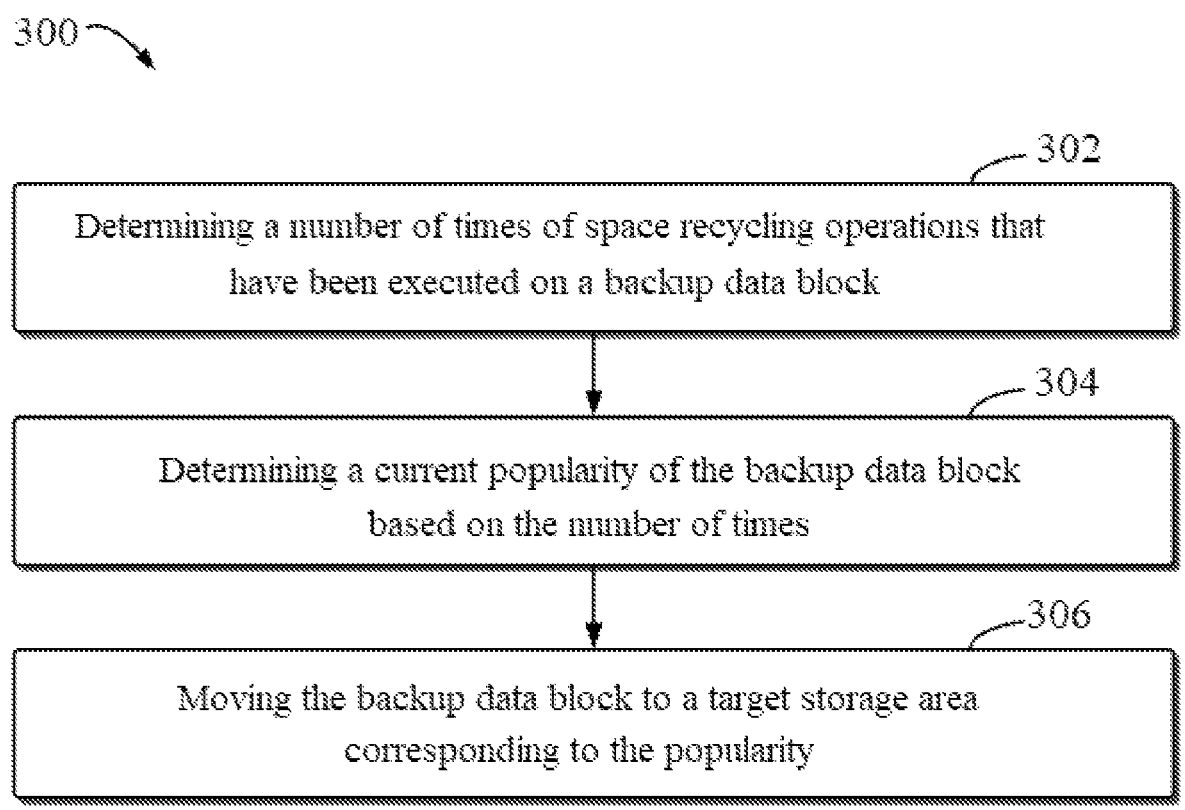
FIG. 3 illustrates a flowchart of a process of managing backup data according to an embodiment of the present disclosure.

A process of storage management according to an embodiment of the present disclosure will be described below with reference to FIG. 3 to FIG. 5. FIG. 3 shows a flowchart of process 300 of managing backup data according to some embodiments of the present disclosure. Process 300, e.g., may be implemented by computing device 110 as shown in FIG. 1.

In block 302, computing device 110 determines a number of times of space recycling operations that have been executed on backup data block 135. For example, computing device 110 may record, for each backup data block 135, the number of times of space recycling operations undergone by the backup data block. When backup data block 135 has undergone a plurality of times of space recycling operations, but has not yet been recycled, it may indicate that the backup data block is relatively stable in the backup system.

It should be understood that the process of block 302 may be executed periodically, or may be executed after each space recycling operation. Furthermore, the process of block 302 may also be executed in response to an administrator's request. It should be understood that the above examples are merely illustrative, rather than limiting, and the present disclosure is not intended to limit the examples.

In block 304, computing device 110, based on the number of times, determines a current popularity of the backup data block, where the current popularity at least indicates a probability that the backup data block will be recycled in a to-be-executed space recycling operation.

In some embodiments, computing device 110 may determine the current popularity based on comparison between the number of times and a preset number threshold. Specifically, in some embodiments, when determining that the number of times is greater than or equal to the number threshold, computing device 110 may determine the current popularity as a preset value. For example, when the number of times is greater than the preset number threshold (e.g., 10 times), computing device 110 may determine the current popularity of the backup data block, e.g., as 0, to indicate that the backup data block is very stable, and will also be less likely to be recycled later.

In some embodiments, when determining that the number of times is less than the number threshold, computing device 110 may determine the current popularity based on a difference between the number of times and the number threshold. In some embodiments, the computing device 110, e.g., may determine the current popularity of the backup data block based on the following equation (1):

$$\text{Current popularity} = \begin{cases} \text{Int}\left(\dfrac{Cm - C}{Cm} \times N\right) + 1, & C < Cm \\ 0, & C \geq Cm \end{cases} \quad (1)$$

$C_m$ represents the number threshold, C represents the number of times of space recycling operations that have been executed on backup data block 135, N represents a number of groups of preset storage areas, and Int represents a rounding-down function. It should be understood that both $C_m$ and N are parameters that may be adjusted based on actual needs.

For example, taking $C_m$ being set as 10, and N being set as 5 as an example, if the backup data block has undergone 10 times of backups (i.e., C is 10), then computing device 110 may determine that the current popularity of the backup data block is 0. If another backup data block has undergone 5 times of backups, then computing device 110 may determine that the current popularity of another backup data block is Int ((10−5)/10*5)+1=3. In this way, for each backup data block, a current popularity thereof can be determined. It should be understood that all the above specific values are merely illustrative, any suitable value may be used as the number threshold or the number of groups, and the present disclosure is not intended to limit the specific values.

In block 306, computing device 110 moves the backup data block to a target storage area corresponding to the popularity, based on a determination that the former storage area where the backup data block is located does not correspond to the current popularity.

In some embodiments, computing device 110 can pre-organize a space in backup storage device 120 into a plurality of different storage areas, one of which may include one or more storage blocks. For example, computing device 110 may pre-apply for using a plurality of different continuous spaces as different storage areas. Furthermore, compute device 110 can associate different storage areas with different popularities, such that backup data blocks with the same popularity are always stored in the same storage area.

Figure 4:
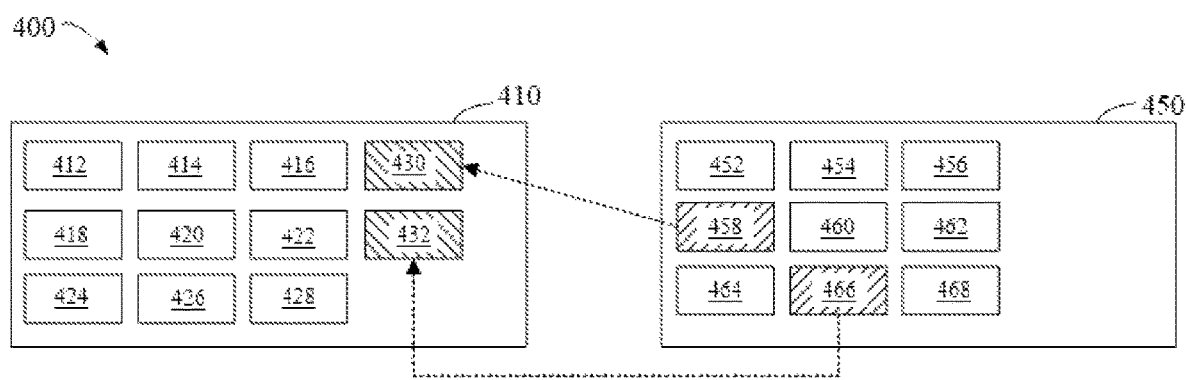
FIG. 4 illustrates a schematic diagram of moving the backup data according to an embodiment of the present disclosure.
Figure 5:
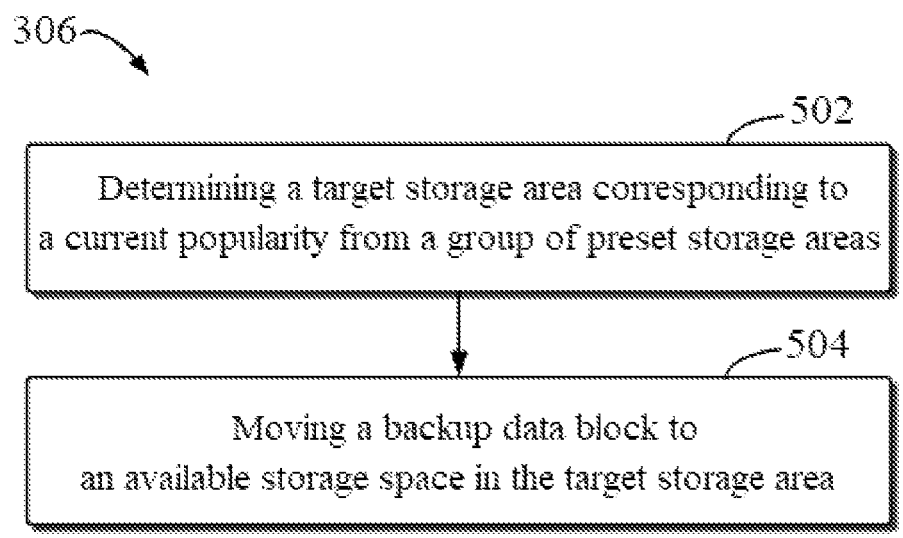
FIG. 5 illustrates a flowchart of an example process of moving the backup data according to an embodiment of the present disclosure.

Taking FIG. 4 as an example, FIG. 4 shows a schematic diagram 400 of moving backup data according to an embodiment of the present disclosure. As shown in FIG. 4, backup storage device 120 may include different storage areas 410 and 420, where, e.g., storage area 410 is associated with a lower popularity (e.g., 1), while storage area 420 is associated with a higher popularity (e.g., 2).

In some embodiments, current popularities of backup data blocks may be updated along with a new space recycling operation. In this case, the backup data bocks need to be moved to a new storage area. Specifically, computing device 110 first may determine a former popularity corresponding to the former storage area.

Taking backup data blocks 458 and 466 in FIG. 4 as an example, a current popularity of backup data blocks 458 and 466 is determined as 1 based on Equation (1) after undergoing a new space recycling process. A pre-determined former popularity of the backup data blocks is a popularity (e.g., 2) corresponding to storage area 450. When determining that the former popularity is different from the current popularity, computing device 110 can determine that the former storage area where the backup data block is located does not correspond to the current popularity. In this case, computing device 110 can move backup data blocks 458 and 466.

A specific process of moving a backup data block will be described below with reference to FIG. 5. FIG. 5 shows a flowchart of an example process of moving backup data according to an embodiment of the present disclosure. As shown in FIG. 5, in block 502, computing device 110 can determine a target storage area corresponding to a current popularity from a group of preset storage areas. Further taking backup data blocks 458 and 466 in FIG. 4 as an example, after determining that their current popularity is 1, computing device 110 can determine a storage area corresponding to a popularity of 1 from a group of storage areas corresponding to different popularities, as storage area 410.

In block 504, computing device 110 can move the backup data blocks to an available storage space in the target storage area. As shown in the figure, computing device 110 can allocate a new storage space in storage area 410 for storing data in backup data blocks 458 and 466, i.e., forming new backup data blocks 430 and 432. Furthermore, computing device 110 can mark a storage space for storing data blocks 458 and 466 in storage area 450 as invalid. It should be understood that the specific values on popularity in the above examples are illustrative, and the present disclosure is not intended to limit the specific values.

Since storage area 410 is a larger pre-allocated storage space, computing device 110 can write new backup data blocks 430 and 432 successively from bottom of the available space, and will not affect other existing backup data blocks. Generally, only when a proportion of invalid backup data blocks in a storage block reaches a preset threshold, can computing device 110 execute merging and release of storage blocks. Therefore, considering that each of the backup data blocks in storage area 410 has a relatively low probability to be invalid in future space recycling operations, a probability that a proportion of invalid backup data blocks in storage area 410 exceeds the threshold will be very low, such that the backup data blocks in the storage area do not need to be rewritten.

Considering that some of the backup data blocks in storage area 410 with a relatively low popularity may still be marked as invalid, e.g., due to backup file deletion, in some embodiments, for different storage blocks in the same storage area 410, computing device 110 can still release spaces of the storage blocks by merging and writing, as in a conventional way. For example, computing device 110 can scan invalid backup data blocks in each storage block of the same storage area 410, to determine whether the proportion of invalid backup data blocks exceeds the threshold. When determining that the proportion of invalid backup data blocks exceeds the threshold, computing device 110 can apply for a new storage block in the storage area, to which valid backup data blocks in the storage block exceeding the threshold are written, and then release the storage block previously exceeding the threshold. In this way, computing device 110 can improve a space utilization in the same storage area 410.

According to the method described above, embodiments of the present disclosure can organize different storage areas based on popularities. In this way, when undergoing a new space recycling operation, data stored in a storage area associated with a relatively low popularity are all backup data blocks with a relatively low popularity. Thus, these backup data blocks will be more likely to remain valid in future space recycling operations, such that an rewriting operation will occur at a relatively low probability for the storage area associated with a relatively low popularity in subsequent space recycling operation processes. Compared with the conventional random storage mode, the embodiments of the present disclosure can extend usable life of backup storage devices.

Figure 6:
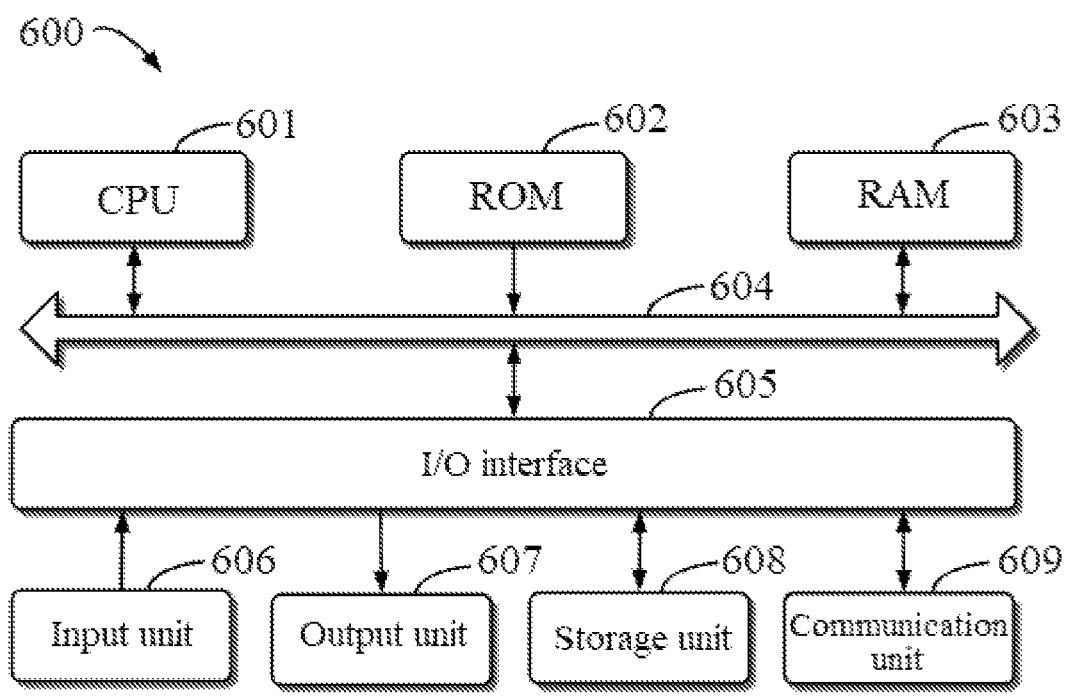
FIG. 6 illustrates a schematic block diagram of an example device that may be configured to implement embodiments of the present disclosure.

FIG. 6 shows a schematic block diagram of an example device 600 that may be configured to implement embodiments of the present disclosure. For example, computing device 110 according to the embodiments of the present disclosure may be implemented by device 600. As shown in the figure, device 600 includes processing unit (CPU) 601, which may execute various appropriate actions and processing in accordance with computer program instructions stored in read-only memory (ROM) 602 or computer program instructions loaded onto random access memory (RAM) 603 from storage unit 608. RAM 603 may further store various programs and data required by operations of device 600. CPU 601, ROM 602, and RAM 603 are connected to each other through bus 604. Input/output (I/O) interface 605 is also connected to bus 604.

A plurality of components in device 600 is connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices via a computer network such as the Internet and/or various telecommunication networks.

The processes and processing described above, such as process 300, may be executed by processing unit 601. For example, in some embodiments, process 300 may be embodied as a computer software program that is tangibly included in a machine-readable medium, such as storage unit 608. In some embodiments, some of or all the computer program can be loaded and/or installed onto device 600 via ROM 602 and/or communication unit 609. When the computer program is loaded into RAM 603 and executed by CPU 601, one or more actions of process 300 described above may be executed.

The present disclosure may be a method, an apparatus, a system, and/or a computer program product. The computer program product may include a computer-readable storage medium with computer-readable program instructions for executing various aspects of the present disclosure loaded thereon.

The computer-readable storage medium may be a tangible device that can retain and store instructions used by an instruction executing device. Examples of the computer-readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punched card or an in-groove raised structure with instructions stored thereon, and any suitable combination thereof. The computer-readable storage medium used herein is not construed as transient signals themselves, such as radio waves or other freely propagated electromagnetic waves, electromagnetic waves propagated through waveguides or other transmission media (e.g., optical pulses through fiber-optic cables), or electrical signals transmitted through wires.

The computer-readable program instructions described here can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions, such that the computer-readable program instructions are stored in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++, and also include conventional procedural programming languages such as the "C" language or similar programming languages. The computer-readable program instructions can be executed entirely on a user computer, partly on the user computer, as a separate software package, partly on the user computer and partly on a remote computer, or entirely on the remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The computer-readable program instructions may be executed by the electronic circuit to implement various aspects of the present disclosure.

Various aspects of the present disclosure are described here with reference to the flowcharts and/or block diagrams of the method, apparatus (system), and computer program product according to the embodiments of the present disclosure. It should be understood that each block in the flowcharts and/or block diagrams as well as a combination of blocks in the flowcharts and/or block diagrams may be implemented by the computer-readable program instructions.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause the computer, the programmable data processing apparatus, and/or another device to operate in a particular manner, such that the computer-readable medium storing the instructions includes a manufactured product, which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the system, method, and computer program product according to a plurality of embodiments of the present disclosure. In this regard, each block in the flowcharts or block diagrams may represent a module, a program segment, or part of an instruction, said module, program segment, or part of an instruction including one or more executable instructions for implementing specified logical functions. In some alternative implementations, the functions noted in the blocks may occur in a sequence different from that shown in the figures. For example, any two blocks presented in succession may actually be executed substantially in parallel, or they may sometimes be executed in a reverse sequence, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skills in the art without departing from the scope and spirit of various illustrated embodiments. The selection of terms used herein is intended to best explain the principles and practical applications of the embodiments or improvements of the technologies on the market, or to cause other persons of ordinary skills in the art to understand the embodiments disclosed herein.

The invention claimed is:

1. A method for managing backup data, comprising:
   determining a number of times of space recycling operations that have been executed on a backup data block;
   determining, based on the number of times, a current popularity of the backup data block, the current popularity at least indicating a probability that the backup data block will be recycled in a to-be-executed space recycling operation; and
   moving, based on a determination that a former storage area where the backup data block is located does not correspond to the current popularity, the backup data block to a target storage area corresponding to the popularity.

2. The method according to claim 1, further comprising:
   marking a former storage space corresponding to the backup data block in the former storage area as invalid.

3. The method according to claim 1, wherein determining a current popularity of the backup data block comprises:
   determining, based on determining that the number of times is equal to or greater than a number threshold, the current popularity as a preset value.

4. The method according to claim 3, wherein determining a current popularity of the backup data block further comprises:
   determining, based on determining that the number of times is less than the number threshold, the current popularity based on a difference between the number of times and the number threshold.

5. The method according to claim 1, further comprising:
   determining a former popularity corresponding to the former storage area; and
   determining, based on a determination that the former popularity is different from the current popularity, that the former storage area where the backup data block is located does not correspond to the current popularity.

6. The method according to claim 1, wherein moving the backup data block to the target storage area comprises:
   determining the target storage area corresponding to the current popularity from a group of preset storage areas; and
   moving the backup data block to an available storage space in the target storage area.

7. An electronic device, comprising:
   at least one processing unit; and
   at least one memory, the at least one memory being coupled to the at least one processing unit and storing instructions to be executed by the at least one processing unit, the instructions, when executed by the at least one processing unit, causing the device to execute actions, the actions comprising:
      determining a number of times of space recycling operations that have been executed on a backup data block;
      determining, based on the number of times, a current popularity of the backup data block, the current popularity at least indicating a probability that the backup data block will be recycled in a to-be-executed space recycling operation; and
      moving, based on a determination that a former storage area where the backup data block is located does not correspond to the current popularity, the backup data block to a target storage area corresponding to the popularity.

8. The device according to claim 7, wherein the actions further comprise:
   marking a former storage space corresponding to the backup data block in the former storage area as invalid.

9. The device according to claim 7, wherein determining a current popularity of the backup data block comprises:
   determining, based on determining that the number of times is equal to or greater than a number threshold, the current popularity as a preset value.

10. The device according to claim 9, wherein determining a current popularity of the backup data block further comprises:
    determining, based on determining that the number of times is less than the number threshold, the current popularity based on a difference between the number of times and the number threshold.

11. The device according to claim 7, wherein the actions further comprise:
    determining a former popularity corresponding to the former storage area; and
    determining, based on a determination that the former popularity is different from the current popularity, that the former storage area where the backup data block is located does not correspond to the current popularity.

12. The device according to claim 7, wherein moving the backup data block to the target storage area comprises:
    determining the target storage area corresponding to the current popularity from a group of preset storage areas; and
    moving the backup data block to an available storage space in the target storage area.

13. A computer program product, the computer program product being stored in a non-transitory computer storage medium and comprising machine-executable instructions, the machine-executable instructions, when running in a device, causing the device to perform actions, the actions comprising:
    determining a number of times of space recycling operations that have been executed on a backup data block;

determining, based on the number of times, a current popularity of the backup data block, the current popularity at least indicating a probability that the backup data block will be recycled in a to-be-executed space recycling operation; and moving, based on a determination that a former storage area where the backup data block is located does not correspond to the current popularity, the backup data block to a target storage area corresponding to the popularity.

14. The computer program product according to claim 13, wherein the actions further comprise:

marking a former storage space corresponding to the backup data block in the former storage area as invalid.

15. The computer program product according to claim 13, wherein determining a current popularity of the backup data block comprises:

determining, based on determining that the number of times is equal to or greater than a number threshold, the current popularity as a preset value.

16. The computer program product according to claim 14, wherein determining a current popularity of the backup data block further comprises:

determining, based on determining that the number of times is less than the number threshold, the current popularity based on a difference between the number of times and the number threshold.

17. The computer program product according to claim 13, wherein the actions further comprise:

determining a former popularity corresponding to the former storage area; and determining, based on a determination that the former popularity is different from the current popularity, that the former storage area where the backup data block is located does not correspond to the current popularity.

18. The computer program product according to claim 13, wherein moving the backup data block to the target storage area comprises:

determining the target storage area corresponding to the current popularity from a group of preset storage areas; and moving the backup data block to an available storage space in the target storage area.

* * * * *